United States Patent [19]
Ohno

[11] Patent Number: 5,666,234
[45] Date of Patent: Sep. 9, 1997

[54] TWO-ELEMENT OPTICAL SYSTEM FOR PHOTOGRAPHIC CAMERAS

[75] Inventor: Kazunori Ohno, Omiya, Japan

[73] Assignee: Fuji Photo Optical Co., Ltd., Omiya, Japan

[21] Appl. No.: 202,462

[22] Filed: Feb. 28, 1994

[30]  Foreign Application Priority Data

Mar. 5, 1993 [JP] Japan .................. 5-069176

[51] Int. Cl.$^6$ .................................... G02B 9/06
[52] U.S. Cl. .................. 359/794; 359/717; 359/739
[58] Field of Search ............... 359/717, 738–739, 359/748, 793–794, 792, 716

[56] References Cited

U.S. PATENT DOCUMENTS

| | | | |
|---|---|---|---|
| 2,610,546 | 4/1952 | Rubin | 359/717 |
| 4,932,764 | 6/1990 | Simpson, Jr. | 359/794 |
| 5,000,552 | 3/1991 | Simpson, Jr. et al. | |
| 5,327,291 | 7/1994 | Baker et al. | 359/716 |

FOREIGN PATENT DOCUMENTS

| | | | |
|---|---|---|---|
| 59-160119 | 9/1984 | Japan | 359/717 |
| 4-107407 | 4/1992 | Japan | 359/717 |
| 0877453 | 10/1981 | Switzerland | |

*Primary Examiner*—James Phan
*Attorney, Agent, or Firm*—Oblon, Spivak, McClelland, Maier & Neustadt, P.C.

[57] ABSTRACT

An optical system composed of two lens elements and a postpositional aperture stop, which are arranged in such a manner as to facilitate mounting on a casing of a camera or lens-equipped photographic film package and to suppress spherical aberration to ensure high quality performance from center to peripheral regions despite asymmetric lens disposition. The optical system includes, from the object side, a first lens element $L_1$, a second lens element $L_2$, and a postpositional aperture stop D located behind the second lens element on the side of the image field. The first lens element is a positive meniscus having a convex surface disposed on the object side, and the second lens element is a biconvex lens. Alternatively, the first lens element is a biconvex lens, and the second lens element is a positive meniscus having a convex surface disposed on the side of the image field. The image surface of the optical system is curved in a convace shape on the object side.

4 Claims, 3 Drawing Sheets

SPHERICAL ABERRATION
SINE CONDITION

FIELD CURVATURE

DISTORTION

FIG·3
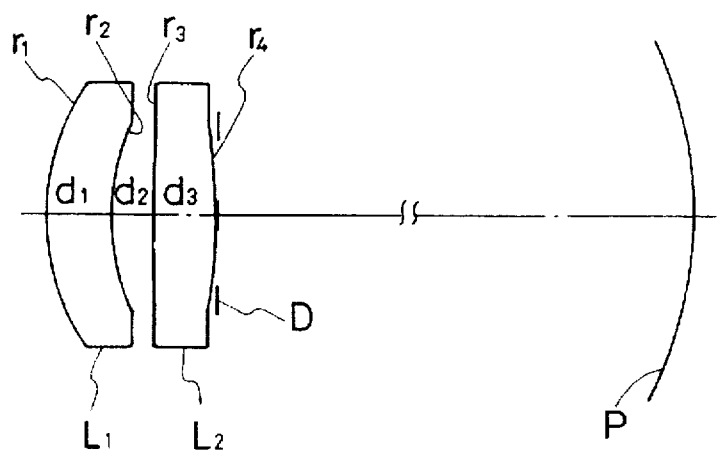
FIG 4A
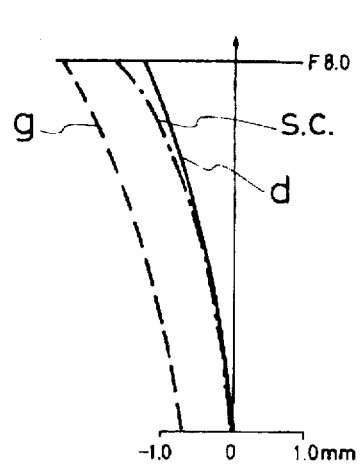
SPHERICAL ABERRATION
SINE CONDITION
FIG 4B
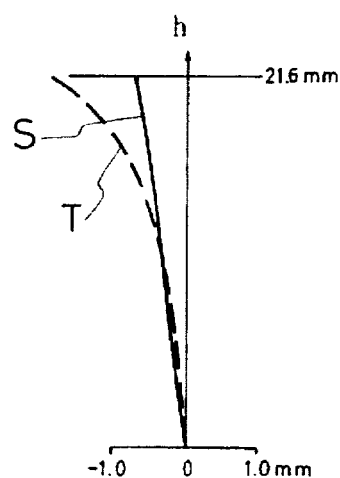
FIELD CURVATURE
FIG 4C
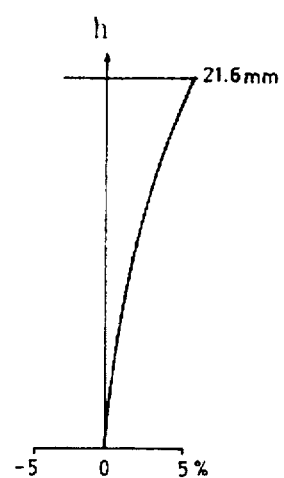
DISTORTION

SPHERICAL ABERRATION
SINE CONDITION

FIELD CURVATURE

DISTORTION

TWO-ELEMENT OPTICAL SYSTEM FOR PHOTOGRAPHIC CAMERAS

BACKGROUND OF THE INVENTION

1. Field of the Art

This invention relates to an optical system particularly suitable for use on simple low-cost photographic cameras or for lens-equipped photographic film packages with a simple camera mechanism intended for use with one roll of film only.

2. Description of the Prior Art

Generally, low-cost cameras for lens-equipped photographic film packages employ a single-element optical system from a standpoint of cost reduction or in some cases a two-element optical system from a standpoint of enhancing the picture quality. A conventional two-element optical system of this sort is described, for example, in U.S. Pat. No. 5,000,552, employing two lens elements, i.e., two positive meniscus lenses which are disposed symmetrically on the front and rear sides of an aperture stop.

In the case of simple and low-cost cameras or the lens-equipped photographic film packages as mentioned above, the shutter needs to be located closely to the aperture stop for the sake of shutter efficiency, and is necessarily of the so-called built-in type which is assembled integrally with the casing of a film package or camera. Therefore, in order to mount the two lens elements in positions on the front and rear sides of an aperture stop, it has been necessary to mount the respective elements in adjusted positions on the opposite sides of the aperture stop separately in different stages of a camera assembling process. This makes the camera assembling process complicated mainly because of the difficulty of aligning the optical axes of the separately mounted lens elements, which would suffer from deteriorations in performance quality if mounted in a misaligned state. Besides, the symmetrical lens disposition inherently suffers from increased spherical aberration in peripheral regions, resulting in unsatisfactorily low illumination by the lens.

SUMMARY OF THE INVENTION

In an attempt to solve the above-mentioned problems or drawbacks, the present invention has as its object the provision of a two-element optical system suitable for use on low-cost photographic cameras or lens-equipped photographic film packages, which can be easily assembled into the casing of a camera or film package and which is reduced in spherical aberration, guaranteeing high quality performance from center to peripheral regions despite asymmetric disposition of the lens elements.

In accordance with the present invention, the above-stated objective is achieved by the provision of a two-element optical system with asymmetric lens disposition relative to an aperture stop, comprising, from the object side, a first positive lens element having a convex surface disposed on the side of the object, a second positive lens element having a convex surface disposed on the side of the image field, and a postpositional aperture stop located behind the second lens element or between the second lens element and the image surface, at least one of the first and second lens element being constituted by a biconvex lens.

The optical system according to the present invention is composed of two lens elements and a postpositional aperture stop located behind the second lens element on the side of the image field. With this arrangement, it becomes possible to pre-assemble the two lens elements in a precisely aligned state on a frame or other suitable lens holder means before mounting them in a casing of a photographic film package or camera. Therefore, the lens assembly, which is formed by pre-assembling the two lens elements in an optically aligned state, can be handled as one integral part when mounting them in a camera casing or the like. Besides, this lens assembly can be mounted in front of an aperture stop in the same manner as in the case of a single-element optical system, contributing to reduce the number of steps in the process of assembling the optical system component parts into a camera casing or film package casing with correct alignment of the optical axes of the respective lens elements, and thus permitting assembly of the respective components of the optical system in a facilitated manner by an automatic operation.

Further, the asymmetric disposition of the lens elements makes it possible to suppress spherical aberration and to increase the maximum diameter of the aperture stop for the purpose of gaining the brightness or illumination of the lens. However, the asymmetric lens disposition of this sort normally suffers from increased lateral chromatic aberration and coma as compared with the symmetrical lens disposition. According to the invention, this problem is solved by employing a biconvex lens for at least one of the two lens elements, thereby correcting lateral chromatic aberration and coma for satisfactory image-forming performance quality without elongating the total length of the lens assembly to such a degree as often is the case with the symmetrical lens disposition.

For the purpose of correcting various aberrations, the two lens elements are preferred to be arranged to satisfy the condition of $0 < r_2/r_3 < 13$ where $r_2$ is the radius of curvature of the first lens element on its rear surface facing toward a second lens element and $r_3$ is the radius of curvature of the second lens element on its front surface facing toward the first lens element. A value of $r_2/r_3$ smaller than the lower limit will be reflected by increased spherical aberration, while a value in excess of the upper limit by undesirably increased field curvature and coma. In addition, it is desirable that at least one of the two lens elements be provided with an aspheric surface to correct field curvature and lateral chromatic aberration further in a favorable manner. Field curvature can be favorably corrected further more by curving the imaging surface in a concave shape on the object side.

Moreover, particularly in the case of lens-equipped photographic film packages or simple low-cost cameras which are subject to severe demands for cost reductions, the lens elements are preferred to be plastic lenses which are easier to manufacture or machine.

BRIEF DESCRIPTION OF THE DRAWINGS

In the accompanying drawings:

FIG. 3 is a diagrammatic illustration of an optical system in a second embodiment of the invention;

FIG. 4 shows aberration characteristics curves for spherical aberration, field curvature and distortion in the second embodiment of FIG. 3;

DESCRIPTION OF PREFERRED EMBODIMENTS

Hereafter, the invention is described more particularly by way of its preferred embodiments with reference to FIGS. 1 through 6 of the accompanying drawings which illustrate the layout of two lens elements in the first to third embodiments along with aberration characteristics curves in the respective embodiments.

In each of the particular embodiments given below, the optical system includes, when seen from the object side, a first lens element $L_1$, a second lens element $L_2$, and a postpositional aperture stop D which is located behind the second lens element $L_2$ on the side of the image field. In the first and second embodiments, the first lens element $L_1$ is constituted by a positive meniscus having a convex surface disposed on the side of the object, and the second lens element $L_2$ is constituted by a biconvex lens. On the other hand, in the third embodiment, the first lens element $L_1$ is a biconvex lens, and the second lens element $L_2$ is a positive meniscus having a convex surface disposed on the side of the image field. In each of these embodiments, the imaging surface P is curved in a concave shape on the object side.

Given below are more specific examples of the respective embodiments, in which:

m: Surface numbers counted sequentially from the object side;

$r_1$–$r_4$: Radii of curvature of the respective lens surfaces;

$d_1$–$d_3$: On-axis thicknesses of the respective lens elements or air space;

$nd_1$, $nd_3$: Indices of refraction of the respective lens elements;

$vd_1$, $vd_3$: Abbe numbers of the respective lens elements;

f: Overall focal length;

bf: Back focus;

$f_1$: Focal length of the first lens element $L_1$; and $f_2$: Focal length of the second lens element $L_2$.

Asterisk "*" indicates an aspheric surface which is expressed by the following asphericity formula (1)

$$X = \frac{Ch^2}{1 + \sqrt{1 - KC^2h^2}} + a_2h^4 + a_3h^6 + a_4h^8 + a_5h^{10} \quad (1)$$

where x is the direction of the optical axis, h is the direction perpendicular to the optical axis, C is the vertex curvature, and K is the eccentricity.

EXAMPLE 1

| m | r | d | nd | vd |
|---|---|---|---|---|
| 1 | *4.848 | 1.531 | 1.492 | 57.6 |
| 2 | 5.106 | 1.046 | | |
| 3 | 57.000 | 1.286 | 1.492 | 57.6 |
| 4 | −56.106 | | | |

Aperture stop: Located at 0.1 mm from the lens surface proximate to the image surface.

Figure 1:
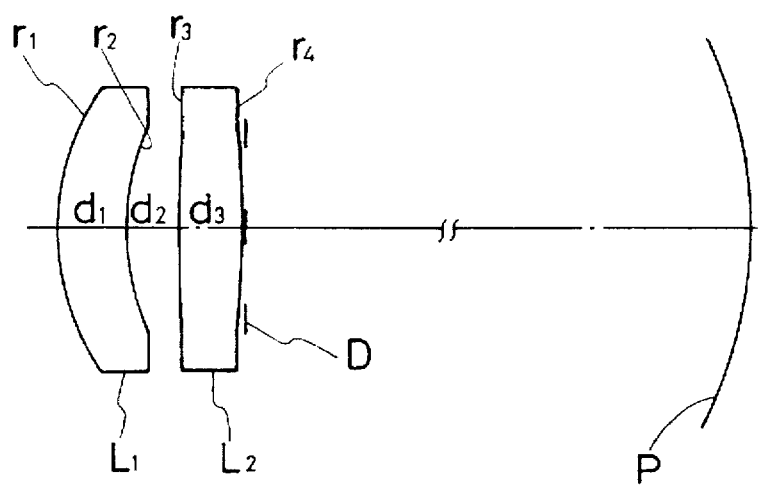
FIG. 1 is a diagrammatic illustration of an optical system in a first particular embodiment of the present invention.
Figure 2A:
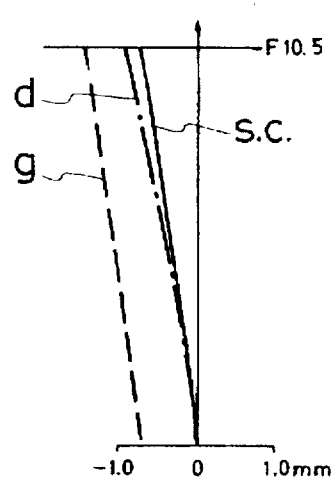
FIG. 2 shows aberration characteristic curves for spherical aberration, field curvature and distortion in the first embodiment of FIG. 1.
Figure 2B:
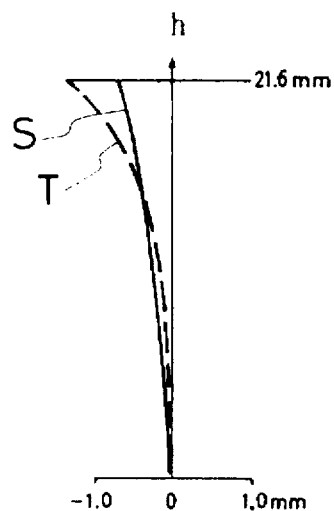
Figure 2C:
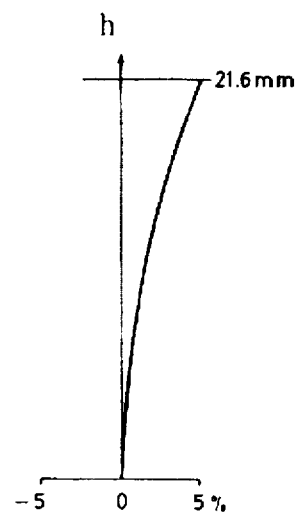
Figure 5:
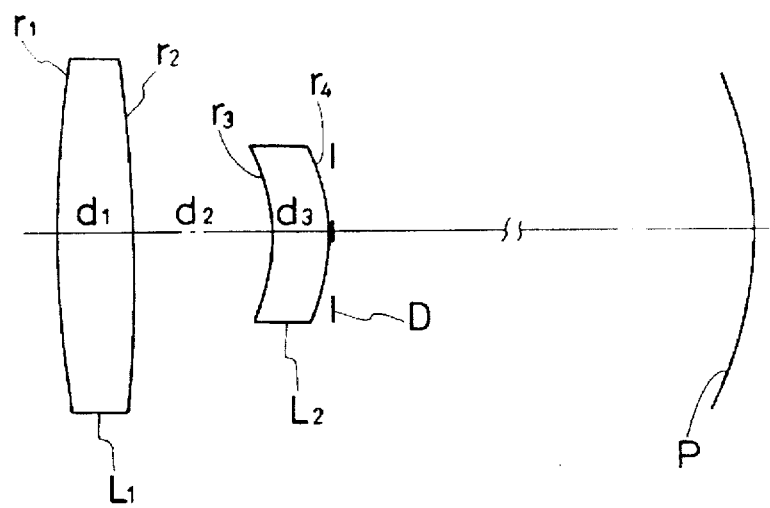
FIG. 5 is a diagrammatic illustration of an optical system in a this embodiment of the invention.

Image surface curvature: −100.0 f = 33.000      bf = 28.393
$f_1'$ = 65.953      $f_2'$ = 57.685
$r_2/r_3$ = 0.08958
Asphericity coefficients C = 0.20627    K = 0.52629    $a_2$ = 3.7887 × $10^{-4}$
$a_3$ = 3.3039 × $10^{-6}$    $a_4$ = −2.8482 × 10−11
$a_5$ = 5.8844 × $10^{-16}$ The spherical aberration, field curvature and distortion in this first embodiment are as shown in FIG. 2.

EXAMPLE 2

| m | r | d | nd | vd |
|---|---|---|---|---|
| 1 | *4.722 | 1.491 | 1.492 | 57.6 |
| 2 | 4.973 | 0.990 | | |
| 3 | 356.67 | 1.253 | 1.492 | 57.6 |
| 4 | −29.524 | | | |

Aperture stop: Located at 0.1 mm from the lens surface proximate to the image surface.

Image surface curvature: −100.0 f = 32.000      bf = 27.719
$f_1'$ = 64.155      $f_2'$ = 55.431
$r_2/r_3$ = 0.01394
Asphericity coefficients C = 0.21177    K = 0.52793    $a_2$ = 4.0987 × $10^{-4}$
$a_3$ = 3.7666 × $10^{-6}$    $a_4$ = −3.4220 × $10^{-10}$
$a_5$ = −7.4505 × $10^{-13}$ The spherical aberration, field curvature and distortion in this second embodiment are as shown in FIG. 4.

EXAMPLE 3

| m | r | d | nd | vd |
|---|---|---|---|---|
| 1 | *35.662 | 1.731 | 1.492 | 57.6 |
| 2 | −53.895 | 3.123 | | |
| 3 | *−4.240 | 1.323 | 1.492 | 57.6 |
| 4 | −4.028 | | | |

Aperture stop: Located at 0.1 mm from the lens surface proximate to the image surface.

Image surface curvature: −100.0 f = 26.473      bf = 26.728
$f_1'$ = 43.861      $f_2'$ = 53.515
$r_2/r_3$ = 12.7110
Asphericity coefficients
Surface number (m): 1

C = 0.02804    K = −42.1631    $a_2$ = 5.1004 × $10^{-5}$
$a_3$ = 8.5984 × $10^{-6}$    $a_4$ = −1.8259 × $10^{-7}$
$a_5$ = −9.4944 × $10^{-13}$
Surface number (m): 3

C = −0.23587    K = 1.86189    $a_2$ = 6.6295 × $10^{-4}$
$a_3$ = 2.0500 × $10^{-4}$    $a_4$ = −7.1518 × $10^{-10}$
$a_5$ = −9.6342 × $10^{-15}$

Figure 6A:
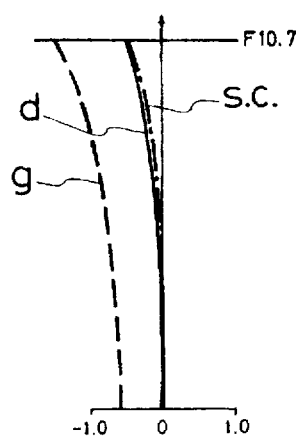
FIG. 6 shows aberration characteristic curves for spherical aberration, field curvature and distortion in the third embodiment of FIG. 5.
Figure 6B:
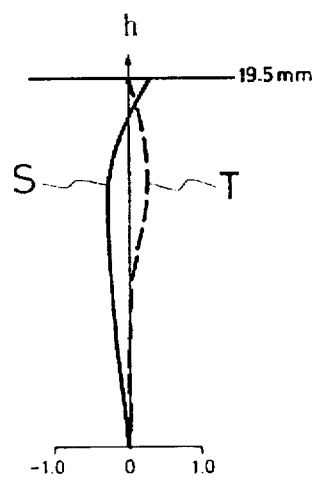
Figure 6C:
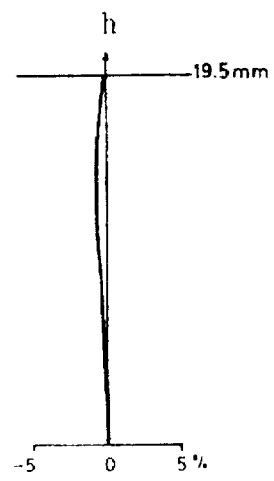

The spherical aberration, field curvature and distortion in this third embodiment are as shown in FIG. 6.

As clear from the foregoing description, the photographic optical system according to the present invention is a two-element system which is composed of, from the object side, a first lens element in the form of a positive lens having a convex surface disposed on the side of the object, a second lens element in the form of a positive lens having a convex surface disposed on the side of the image field, and a postpositional aperture stop located behind the second lens element or on the side of the image field. Therefore, it becomes possible to pre-assemble the first and second lens elements into one integral part which holds the two lens elements in optically aligned state and which can be easily mounted in front of an aperture stop on a casing of a simple low-cost camera or of a lens-equipped photographic film package in an extremely facilitated manner. Besides, despite the asymmetric lens disposition which is normally considered to be disadvantageous with respect to lateral chromatic aberration and coma, the optical system of the present invention can effectively correct these aberrations as compared with the symmetrical lens disposition, by employing a biconvex lens for at least one of the two lens elements, and can broaden the open area of the aperture stop for higher illumination through the lens free of the problem of increased spherical aberration in peripheral regions of the lens, a problem inherent to the symmetrical lens disposition.

What is claimed is:

1. A two lens element optical system in a photographic camera having an image field, comprising:
    a first positive lens element having a convex surface disposed on a side of the object;
    a second positive lens element having a convex surface disposed on the side of the image field, wherein there is no negative lens positioned between said first and second positive lenses; and
    a postpositional aperture stop located behind said second lens element on the side of the image field, wherein there is no lens element positioned between said second positive lens element and said postpositional aperture stop;
    wherein at least one of said first lens element and said second lens element comprises a biconvex lens and wherein an image surface of said optical system is curved in a concave shape on the object side.

2. A two-element optical system as defined in claim 1, wherein said first lens element and said second lens element are arranged to satisfy the condition of $$0 < r_2/r_3 < 13$$

where $r_2$ is the radius of curvature of said first lens element on the rear surface facing toward said second lens element, and $r_2$ is the radius of curvature of said second lens element on the front surface facing toward said first lens element.

3. A two-element optical system as defined in claim 1, wherein at least one of the lens surfaces of at least one of said first lens element and said second lens element is an aspheric surface.

4. A two-element optical system as defined in claim 1, wherein both of said first lens element and said second lens element are plastic lenses.

* * * * *